(12) United States Patent
Parsons et al.

(10) Patent No.: US 10,578,498 B2
(45) Date of Patent: Mar. 3, 2020

(54) AIR TEMPERATURE SENSOR

(71) Applicant: Unison Industries, LLC, Jacksonville, FL (US)

(72) Inventors: John Patrick Parsons, Afton, NY (US); Gregory Lloyd Ashton, South Plymouth, NY (US); Jarodd Dan Goedel, Sherburne, NY (US); Chiong Siew Tan, Binghamton, NY (US)

(73) Assignee: Unison Industries, LLC, Jacksonville, FL (US)

( * ) Notice: Subject to any disclaimer, the term of this patent is extended or adjusted under 35 U.S.C. 154(b) by 188 days.

(21) Appl. No.: 15/630,573

(22) Filed: Jun. 22, 2017

(65) Prior Publication Data

US 2018/0372559 A1 Dec. 27, 2018

(51) Int. Cl.
*G01K 13/02* (2006.01)
*G01K 1/08* (2006.01)

(52) U.S. Cl.
CPC ............ *G01K 13/028* (2013.01); *G01K 1/08* (2013.01); *G01K 2013/024* (2013.01)

(58) Field of Classification Search
CPC ... G01K 13/028; G01K 1/08; G01K 2013/024
See application file for complete search history.

(56) References Cited

U.S. PATENT DOCUMENTS

| | | | |
|---|---|---|---|
| 2,970,475 A * | 2/1961 | Werner | .................. G01K 13/02 374/138 |
| 4,142,824 A | 3/1979 | Andersen | |
| 5,476,364 A | 12/1995 | Kildea | |
| 5,733,102 A | 3/1998 | Lee et al. | |
| RE36,215 E | 6/1999 | Rosenthal | |
| 6,267,328 B1 | 7/2001 | Vest | |
| 6,443,395 B1 | 9/2002 | Porte et al. | |
| 6,609,825 B2 | 8/2003 | Ice et al. | |
| 6,941,805 B2 | 9/2005 | Seidel et al. | |
| 6,971,851 B2 | 12/2005 | Liang | |
| 7,118,342 B2 | 10/2006 | Lee et al. | |
| 7,156,552 B2 | 2/2007 | Fleming | |
| 7,174,782 B2 | 2/2007 | Ice | |
| 7,313,963 B2 | 1/2008 | Kuznar | |
| 7,328,623 B2 | 2/2008 | Slagle et al. | |
| 7,357,572 B2 | 4/2008 | Benning et al. | |
| 7,441,948 B2 | 10/2008 | Bernard et al. | |
| 7,674,036 B2 | 3/2010 | Severson | |
| 7,845,222 B1 | 12/2010 | Goedel et al. | |
| 7,854,548 B2 | 12/2010 | Sandnas et al. | |

(Continued)

FOREIGN PATENT DOCUMENTS

| | | |
|---|---|---|
| CA | 2449335 | 1/2008 |
| CN | 104139863 A | 11/2014 |

OTHER PUBLICATIONS

Chinese Patent Office, Office Action re Chinese Patent Application No. 201810514359.9, Dec. 18, 2019, 6 pages, China.

*Primary Examiner* — Lisa M Caputo
*Assistant Examiner* — Philip L Cotey
(74) *Attorney, Agent, or Firm* — McGarry Bair PC

(57) ABSTRACT

A total air temperature sensor can include a first airfoil having a heated first surface, a second airfoil having a second surface spaced from the first surface and defining a sensor chamber, a temperature sensor located within the chamber, and a sheath surrounding the temperature sensor.

12 Claims, 7 Drawing Sheets

(56) References Cited

U.S. PATENT DOCUMENTS

| | | | |
|---|---|---|---|
| 8,100,582 B1 | 1/2012 | Powell | |
| 8,157,440 B2 | 4/2012 | Kulczyk | |
| 8,172,507 B2 | 5/2012 | Liang | |
| 8,511,179 B2* | 8/2013 | Kelnhofer | B64D 13/00 73/861.351 |
| 8,517,604 B2 | 8/2013 | Parsons | |
| 9,038,453 B2 | 5/2015 | Paris | |
| 9,085,988 B2 | 7/2015 | Kwon et al. | |
| 9,488,534 B2 | 11/2016 | Wigen et al. | |
| 9,494,050 B2 | 11/2016 | Schnoebelen et al. | |
| 9,631,985 B2 | 4/2017 | Herman | |
| 9,815,558 B2* | 11/2017 | Saeed | B64D 15/04 |
| 2004/0237641 A1* | 12/2004 | Hanson | B64D 15/12 73/170.02 |
| 2004/0261518 A1* | 12/2004 | Seidel | B64D 43/02 73/182 |
| 2007/0220984 A1* | 9/2007 | Slagle | G01K 13/02 73/708 |
| 2010/0108814 A1* | 5/2010 | Etling | B64D 15/04 244/134 B |
| 2010/0176243 A1 | 7/2010 | Nieman et al. | |
| 2012/0285261 A1* | 11/2012 | Goedel | G01K 13/028 73/861.42 |
| 2013/0163636 A1* | 6/2013 | Parsons | G01K 13/028 374/158 |
| 2014/0178207 A1 | 6/2014 | He et al. | |
| 2016/0032757 A1 | 2/2016 | Liu et al. | |
| 2016/0153284 A1 | 6/2016 | Kwon et al. | |
| 2017/0058772 A1 | 3/2017 | Frank et al. | |
| 2017/0166313 A1* | 6/2017 | Saeed | B64D 15/04 |
| 2017/0217593 A1* | 8/2017 | Ishida | B64D 15/04 |
| 2017/0314465 A1* | 11/2017 | Beutin | F02K 3/025 |
| 2018/0170557 A1* | 6/2018 | Lorenz | B64D 15/12 |

* cited by examiner

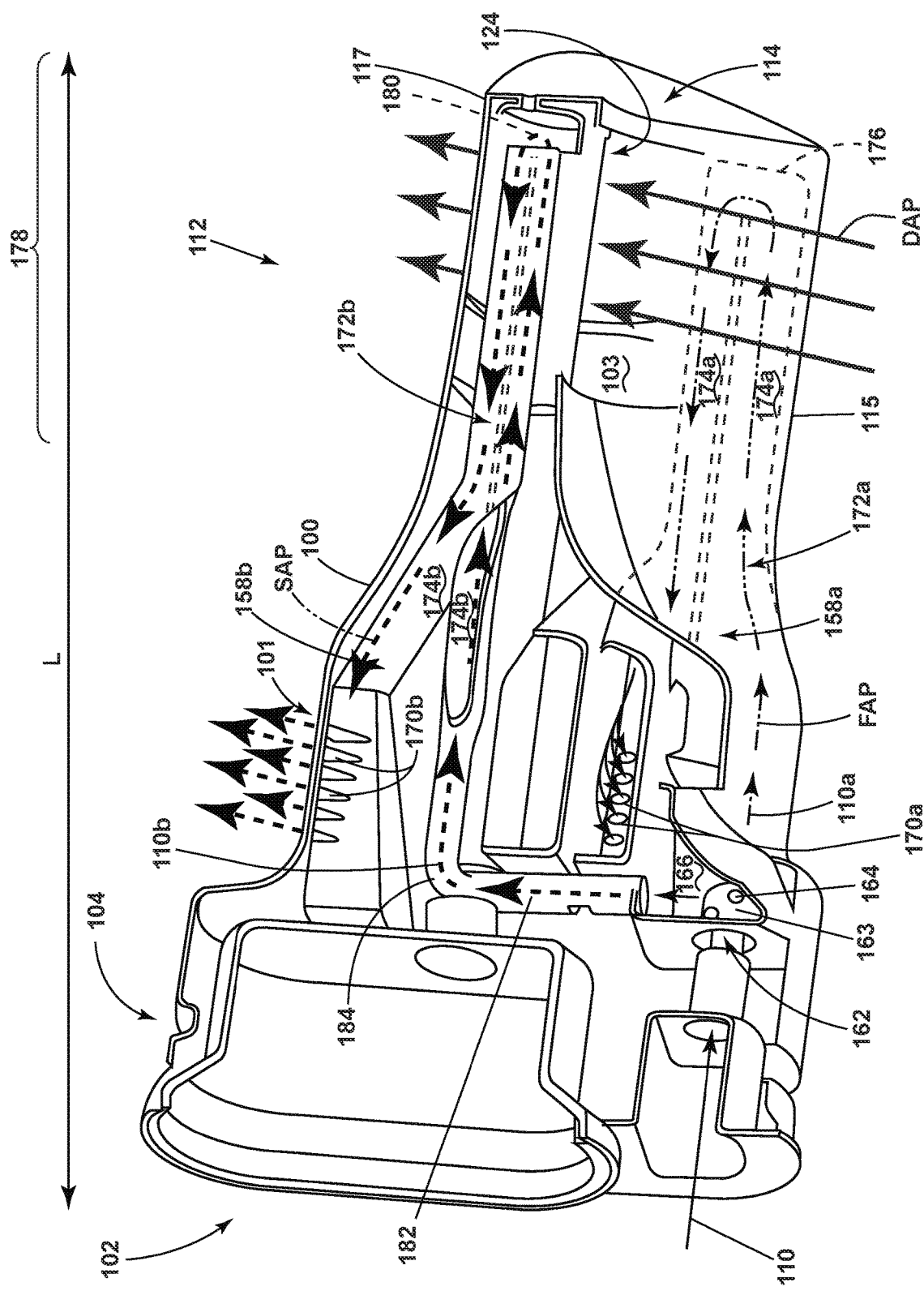

AIR TEMPERATURE SENSOR

BACKGROUND OF THE INVENTION

Turbine engines, and particularly gas or combustion turbine engines, are rotary engines that extract energy from a flow of combusted gases passing through the engine onto a multitude of rotating turbine blades. Gas turbine engines have been used for land and nautical locomotion and power generation, but are most commonly used for aeronautical applications such as airplanes or helicopters. In airplanes, gas turbine engines are used for propulsion of the aircraft.

During operation of a turbine engine, the total air temperature also known as stagnation temperature can be measured by a specially designed temperature probe mounted on the surface of the aircraft or the interior walls of the turbine engine. The probe is designed to bring the air to rest relative to the aircraft. The air experiences an adiabatic increase in temperature as it is brought to rest and measured, and the total air temperature is therefore higher than the ambient air temperature. Total air temperature is an essential input for calculating static air temperature and true airspeed. Total air temperature sensors can be exposed to adverse conditions including high Mach numbers and icing conditions, as well as water and debris, which may affect the reading provided by the sensor.

BRIEF DESCRIPTION OF THE INVENTION

In one aspect, the disclosure relates to an air temperature sensor suitable for use on an aircraft, the temperature sensor comprising a housing defining an interior and having at least a portion with an airfoil cross section to define an airfoil portion with an upper surface and a lower surface, a temperature sensor located within the airfoil portion, an airflow path having an inlet in the upper surface of the housing and extending through the housing to the temperature sensor to provide for diverted air from air flowing along the upper surface to contact the temperature sensor; and a set of fluid passageways defined within the interior and having an inlet and a set of outlets located within the housing and where the set of fluid passageways are configured to receive hot bleed air via the inlet and disperse the hot bleed air to the set of outlets to heat at least a portion of the airfoil portion.

In another aspect, the disclosure relates to an air temperature sensor, comprising a housing having a skin and defining an interior, a temperature sensor having a first portion located within the interior and a second portion extending through a portion of the housing and at least partially adjacent a portion of the skin, and a set of fluid passageways defined within the interior and configured to receive hot bleed air and disperse the hot bleed air to at least two separate portions of the skin.

In yet another aspect, the disclosure relates to a method of forming a total air temperature sensor housing, the method comprising forming, via additive manufacturing a housing having an exterior surface and defining an interior and having at least a portion with an airfoil cross section to define an airfoil portion with an upper surface and a lower surface and having a set of fluid passageways defined within the interior and having an inlet and a set of outlets located within the housing and where the set of fluid passageways are configured to receive hot bleed air via the inlet and disperse the hot bleed air to the set of outlets to heat at least a portion of the exterior surface of at least a portion of the airfoil cross section.

BRIEF DESCRIPTION OF THE DRAWINGS

In the drawings:

FIG. 7 is a partial cross-sectional view of the total air temperature from FIG. 2 with a dispersion chamber.

DESCRIPTION OF EMBODIMENTS OF THE INVENTION

Figure 1:
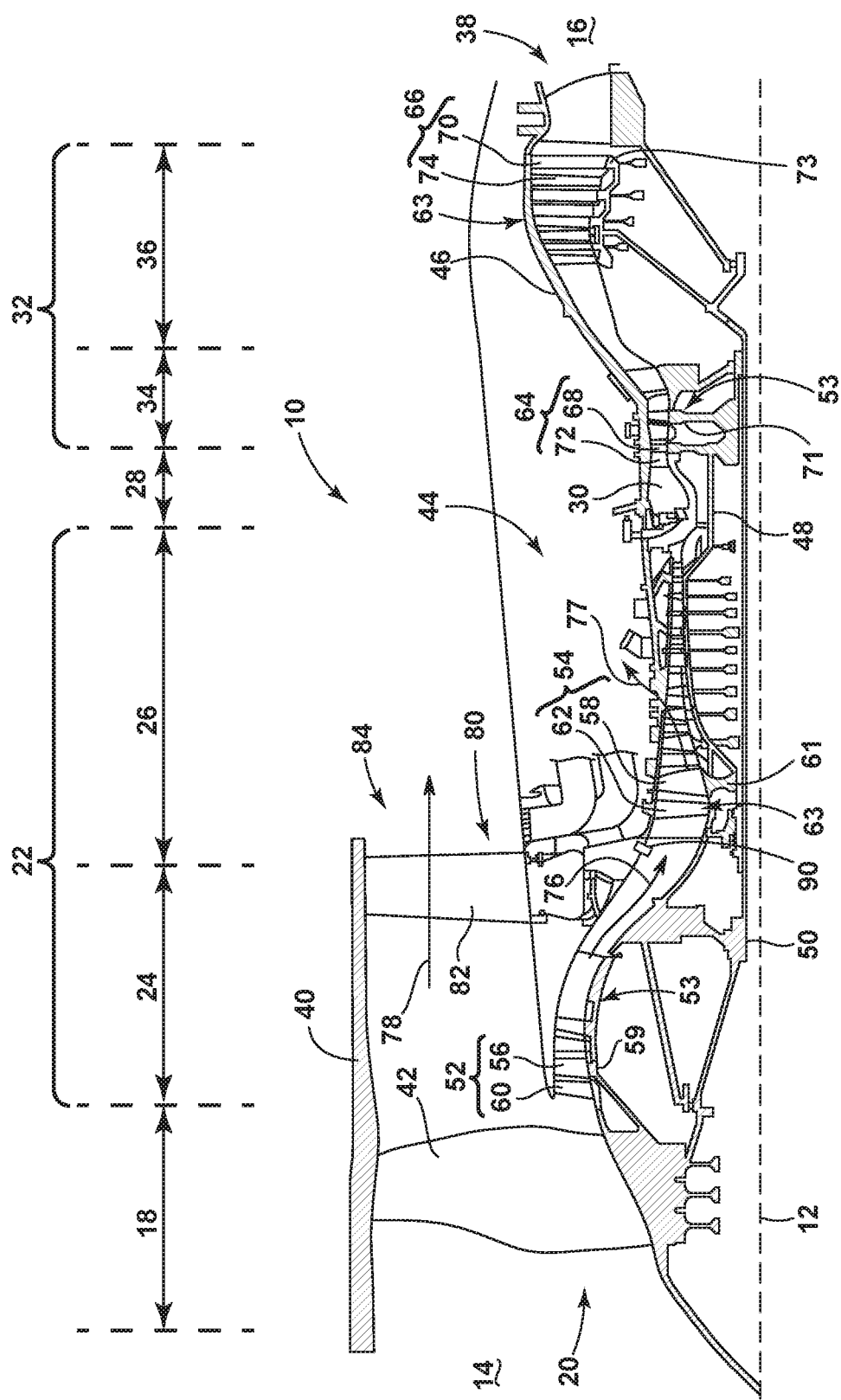
FIG. 1 is a schematic cross-sectional diagram of a turbine engine for an aircraft with a total air temperature sensor.

The described embodiments of the present disclosure are directed to an air temperature sensor for an aircraft turbine engine. It will be understood, however, that the disclosure is not so limited and may have general applicability within an engine, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference. A "set" as used herein can include any number of a particular element, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order, and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40. A total air temperature (TAT) sensor 90 can be disposed in the fan casing 40 as shown; however, this example is not meant to be limiting and the TAT sensor 90 may be positioned in other locations in the turbine engine 10.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
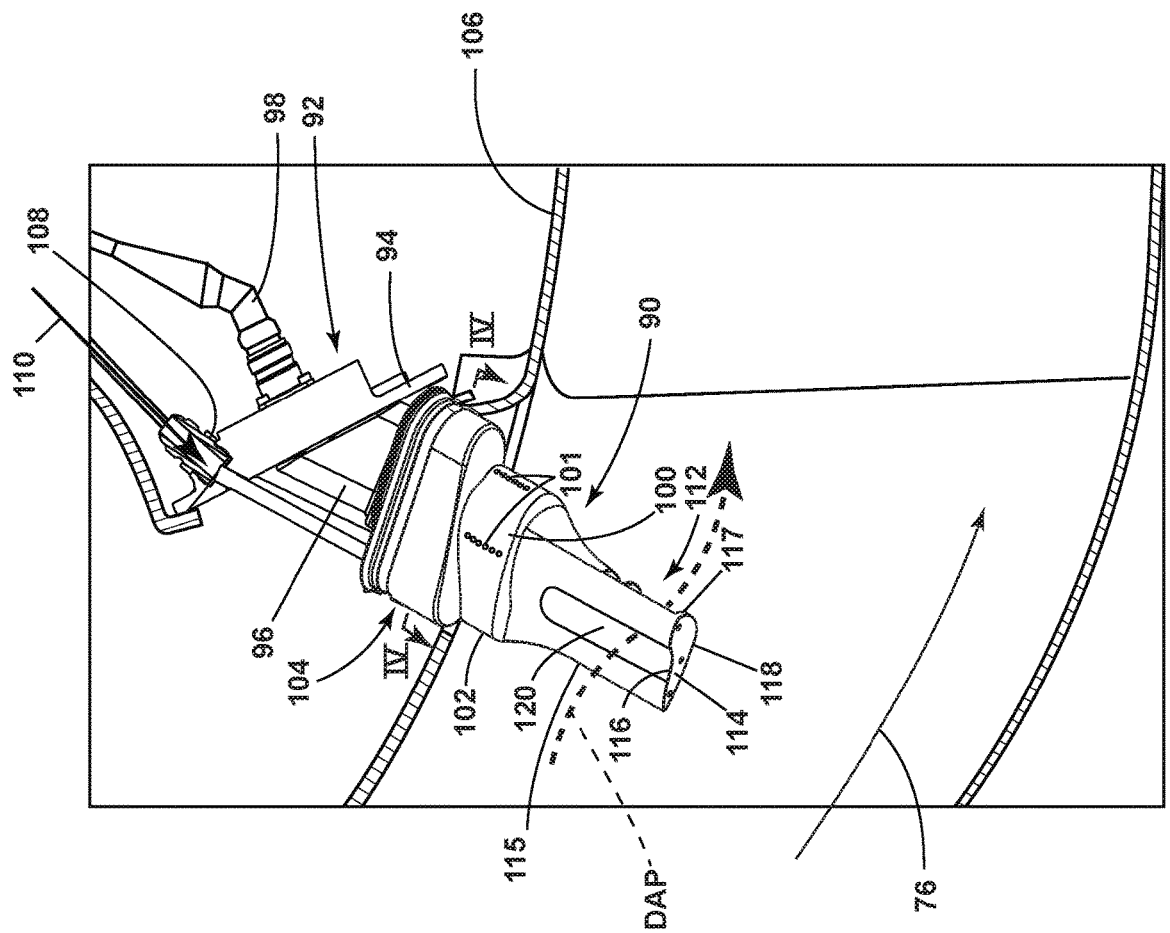
FIG. 2 is an enlarged isometric view of the total air temperature sensor in a partially cut-away portion of the engine of FIG. 1

FIG. 2 more clearly depicts the TAT sensor 90 in a cut away portion of the engine 10. A mounting section 92 having a suitable mounting portion 94 can be included in the TAT sensor 90. A wiring housing 96 can be included in the mounting section 92 and can be coupled to an electrical conduit 98. The mounting section 92 can be any suitable mounting portion 94 and is not meant to be limiting. A housing 102 is mounted at an upper section 104 of the housing 102 to a portion of the aircraft engine 10 at the mounting section 92. A tube inlet 108 couples to the housing 102 and is coupled to a source of hot bleed air. By way of non-limiting example bleed air 110 is illustrated as entering the tube inlet 108.

A skin 100 defines an exterior surface 103 of the housing 102 of the TAT sensor 90. At least one set of outlets 101 is included in the skin 100. The skin 100 can include at least two separate portions of the skin 100a, 100b that can be wetted surfaces. A wetted surface can be any surface susceptible to condensation and ice accumulation.

A lower section 112 of the housing 102 defines an airfoil portion 114. A portion of the skin 100 can form the airfoil portion 114 of the lower section 112. The airfoil portion 114 can have a concave side, or an upper surface 116 and a convex side, or a lower surface 118. The airfoil portion 114 can extend from a leading edge 115 to a trailing edge 117. A temperature sensor inlet 120 in the upper surface 116 extends through the portion of the skin 100b to an outlet 122 (FIG. 3) to provide a diverted airflow path (DAP) for a portion of the pressurized airflow 76.

Figure 3:
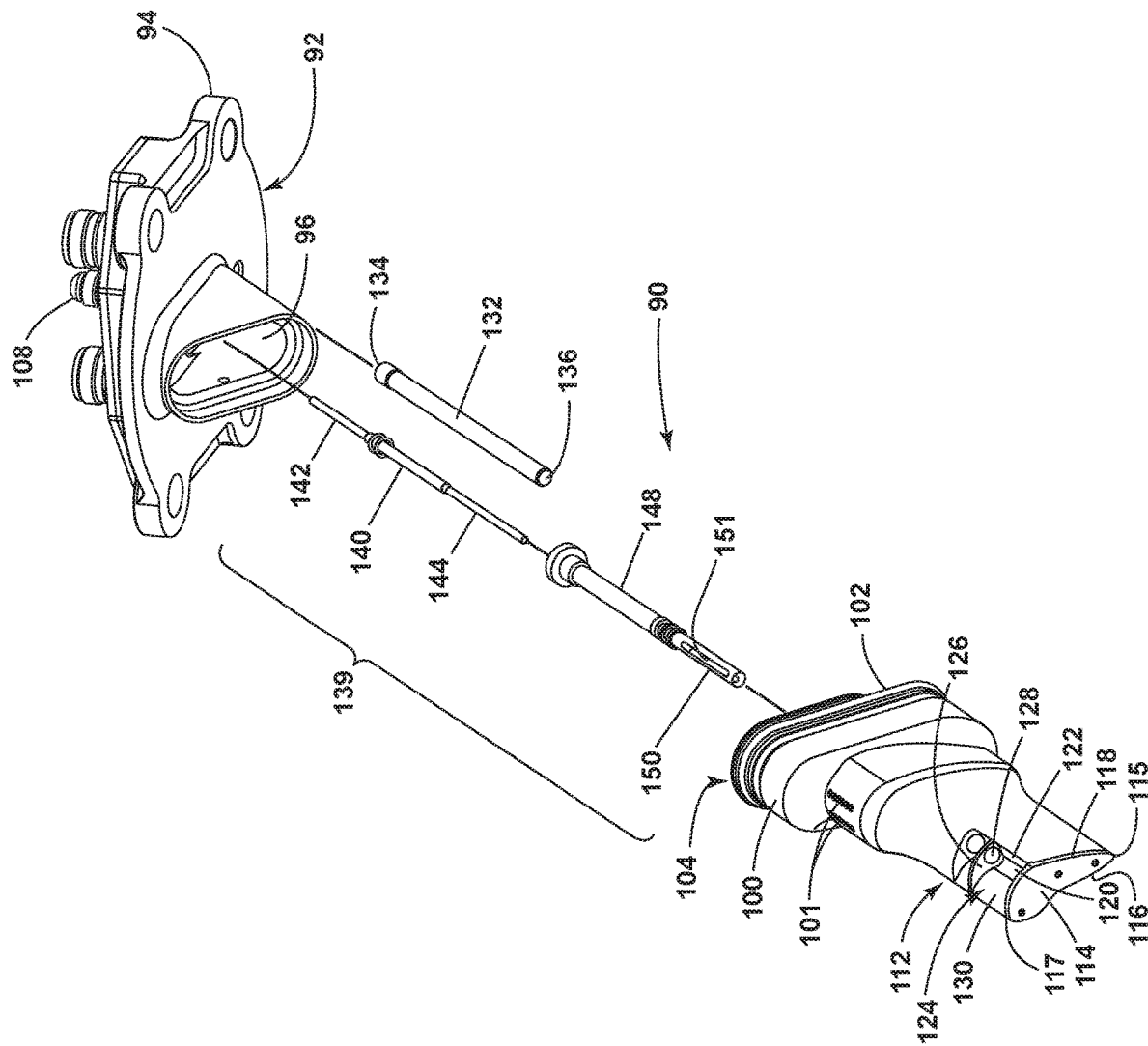
FIG. 3 is an exploded view of the total air temperature sensor of FIG. 2.

Turning to FIG. 3, an exploded view of the TAT sensor 90 is illustrated. The TAT sensor 90 is illustrated in a different orientation than that of FIG. 2 to more clearly show the temperature sensor outlet 122 adjacent an open portion 124 defined by the lower section 112 of the housing. The open portion 124 defined by the housing 102 separates the two portions of the skin 100a, 100b to define the temperature sensor outlet 122 there between. The temperature sensor outlet 122 is proximate the trailing edge 117 and on the lower surface 118 of the airfoil portion 114.

A tube, by way of non-limiting example a piccolo tube 132 extends from a first end 134 to a second end 136. The first end 134 is coupled to the tube inlet 108 and the second end 136 can extend into the housing 102.

A temperature sensor assembly 139 includes an upper sheath 140, protective sleeving 142, and a temperature sensor 144. The temperature sensor 144 is a total air temperature sensor suitable for use on an aircraft, within the engine 10.

The temperature sensor assembly 139 can further include a locking mechanism 148 and a lower sheath 150. The locking mechanism 148 can be located within the housing 102. The lower sheath 150 can include slot opening 151 through which diverted air along the diverted airflow path (DAP) can contact the temperature sensor 144. The locking mechanism 148 can be shaped in any suitable manner and orientated in any suitable manner with respect to the diverted airflow path (DAP) and the temperature sensor 144. At least one rib 126 with an aperture 128 can be located within the open portion 124. When assembled, the at least one rib 126 can aide in stabilizing the lower sheath 150 surrounding the temperature sensor 144.

Figure 4:
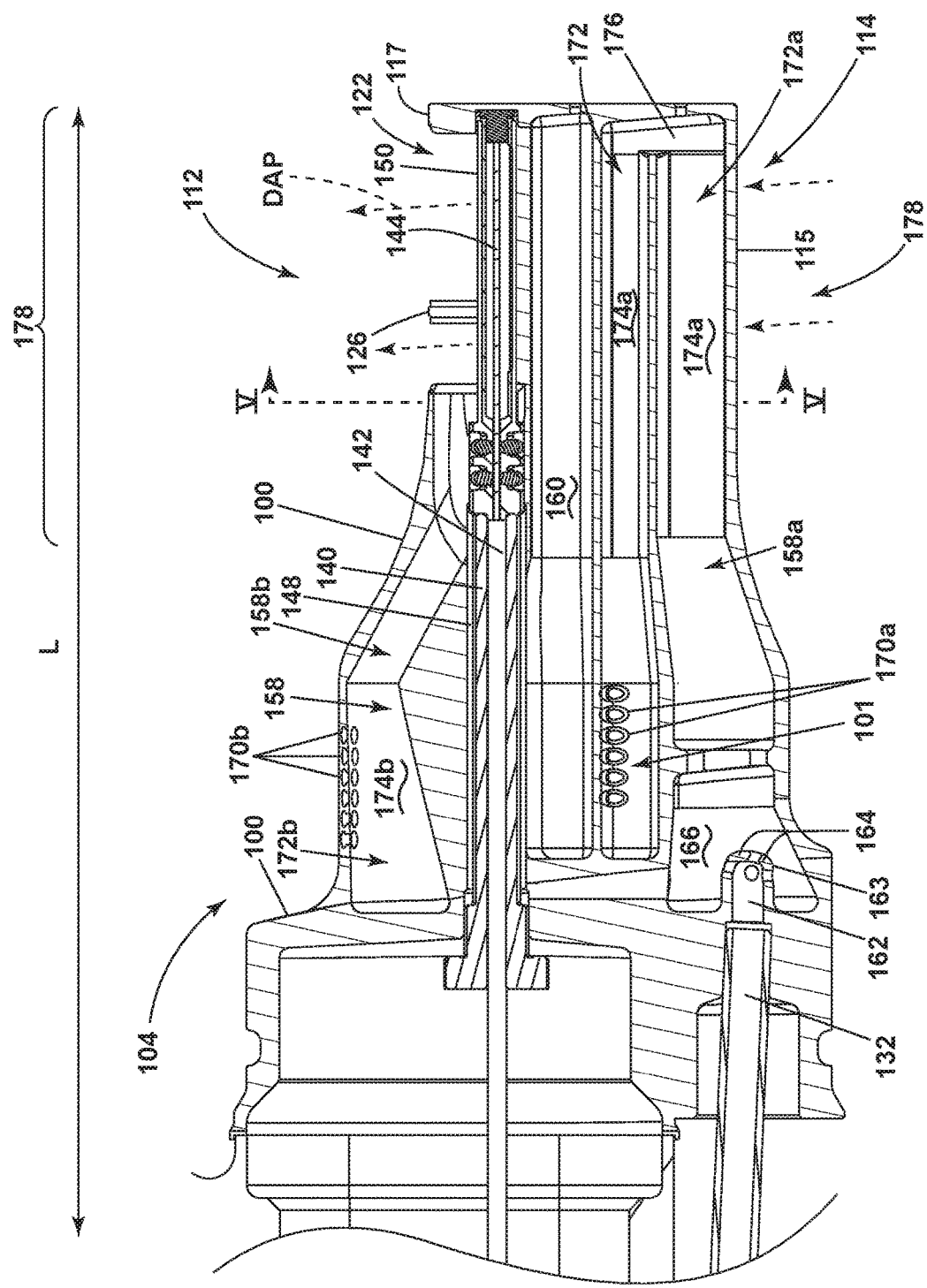
FIG. 4 is a cross-sectional view of the total air temperature sensor taken along line IV-IV of FIG. 2.

More specifically, when assembled, as in FIG. 4, the lower sheath 150 is located within the open portion 124 defined by the housing 124. The lower sheath 150 extends through the aperture 128 of the at least one rib 126. The locking mechanism 148 of the temperature sensor assembly 139 encompasses the protective sleeving 142 and upper sheath 140 of the temperature sensor 144. The lower sheath 150 encompasses the temperature sensor 144.

An interior 158 of the housing 124 is defined at least in part by the skin 100. A first portion 158a of the interior 158 can be included within the first portion of the skin 100a. A second portion 158b of the interior 158 can be located within the second portion of the skin 100b.

A dispersion chamber 166 is located within the interior 158 of the housing 124. The dispersion chamber 166 can be defined by a set of walls 192 and be fluidly coupled to a transfer tube 182 and a set of intermediate conduits 198.

An inlet 162 into the dispersion chamber 166 is defined by a tip 163 having a set of spray openings 164. The tip 163 defines the inlet 162 and is operably coupled to one of the set of walls 192. The second end 136 of the piccolo tube 132 is coupled to the interior 158 of the housing 124 via the tip 163.

The set of outlets 101 can include multiple sets of outlets 101 provided within the skin 100. A first set of outlets 101a is provided within the first portion 158a and a second set of outlets 101b is provided within the second portion 158b.

A set of fluid passageways 172 is provided throughout the interior 158. The set of fluid passageways 172 can include a first fluid passageway 172a within the first portion 158a of the interior 158. The first fluid passage way 172a includes a first set of channels 174a fluidly connecting the dispersion chamber 166 to the first set of outlets 101a. The exemplary first set of channels 174a includes parallel channels 174a of similar width and length coupled by a first turn 176. In this manner the first fluid passageway 172a doubles back along a portion 178 of a length (L) of the housing 102. It is contemplated that the first set of channels 174a are oriented in any suitable manner including but not limited to in parallel, in serpentine, or in series patterns, such that the dispersion chamber 166 is fluidly coupled to the first set of outlets 101a within the first portion 158a of the interior 158.

A second fluid passageway 172b within the second portion 158b of the interior 158 includes a second set of channels 174b fluidly connecting the dispersion chamber 166 to the second set of outlets 101b.

A set of dead air spaces 160 can also be included within the housing 102. The set of dead air spaces 160 are fluidly separate from the set of fluid passageways 172. By way of non-limiting example, the dead air spaces 160 can be located within the housing 102 where hot air need not be dispersed. The set of dead air spaces 160 can be located between the first portion 158a and the second portion 158b, such that at least a portion of the set of dead air spaces 160 extends parallel to the first and second set of channels 174a, 174b.

Figure 5:
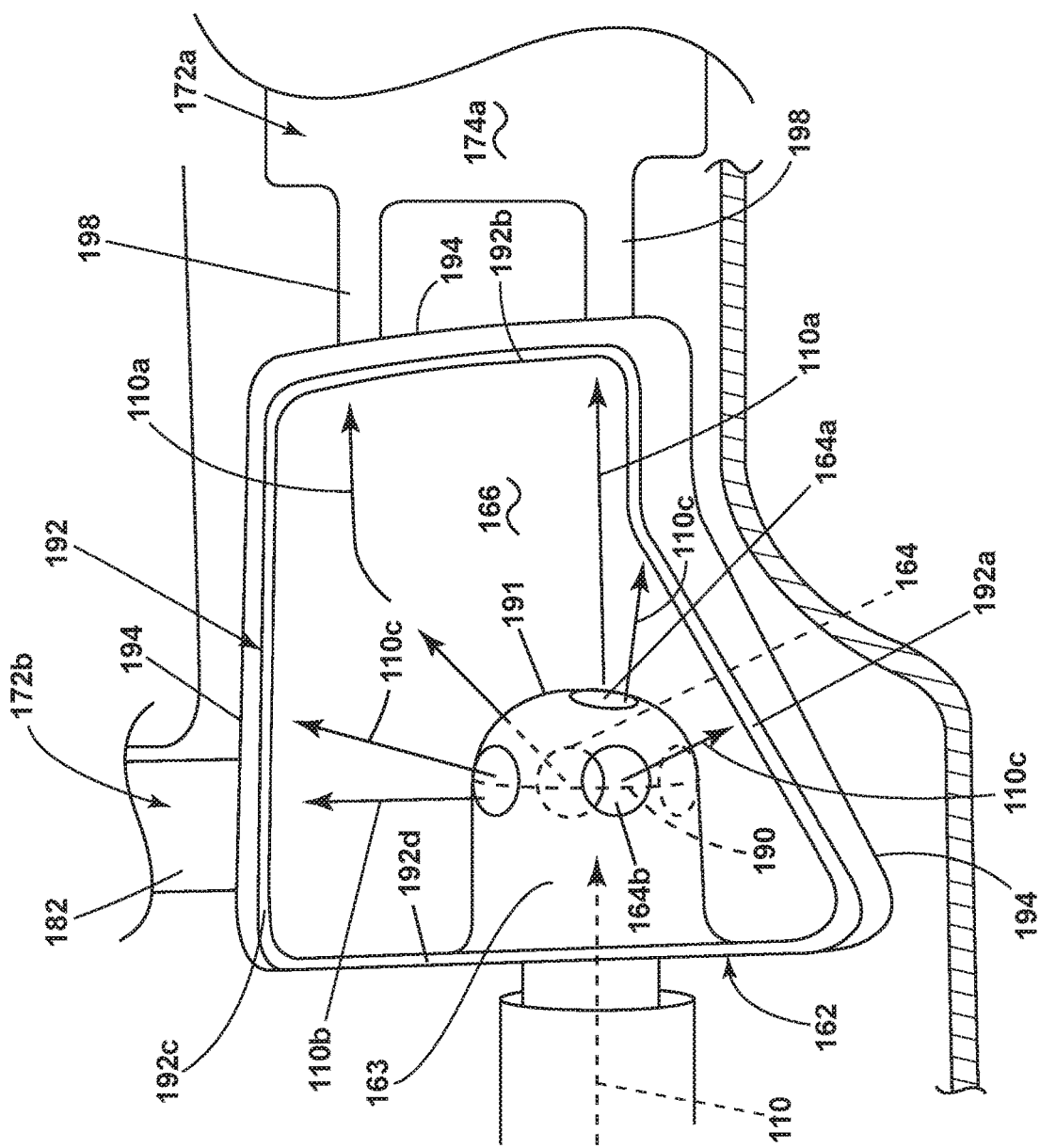
FIG. 5 is a cross-sectional view of the total air temperature sensor taken along line V-V of FIG. 4.

FIG. 5 more clearly shows a portion of the dispersion chamber 166 and the set of spray openings 164. A cap 191 forms the tip 163 and the set of spray openings 164 are located about portions of the cap 191. The cap 191, can be rounded having a perimeter 190 and the set of spray openings 164 can be spaced about the perimeter 190. At least one of the spray openings 164a can be formed at a distal end 196 of the tip 163. As illustrated the set of spray openings 164 can be a plurality of spray openings 164 equally spaced about the perimeter 190 and configured to spray the hot bleed air 110 within the dispersion chamber 166.

The set of walls 192 forming the dispersion chamber 166 can include an angled surface 192a, a series surface 192b, a parallel surface 192c, and an inlet surface 192d. A set of corners 194 can be defined where any two of the set of walls meet.

The set of spray openings 164 is configured to direct hot bleed air into the dispersion chamber 166, onto the walls forming the dispersion chamber 166, and into the fluid passageways 172. In the illustrated example, a first portion 110a of the hot bleed air is directed into the first fluid passageways 172a via the set of intermediate conduits 198. The set of spray openings is further configured to direct a second portion 110b of hot bleed air into the second fluid passageways 172b (FIG. 4) via the transfer tube 182. The hot bleed air 110 can be separated into further portions of hot bleed air 110c, wherein at least one of the further portions of hot bleed air 110c is introduced to the set of corners 194 and/or the set of walls 192. In particular at least one spray opening 164b is oriented such that it heats the angled surface 192a.

Figure 6:
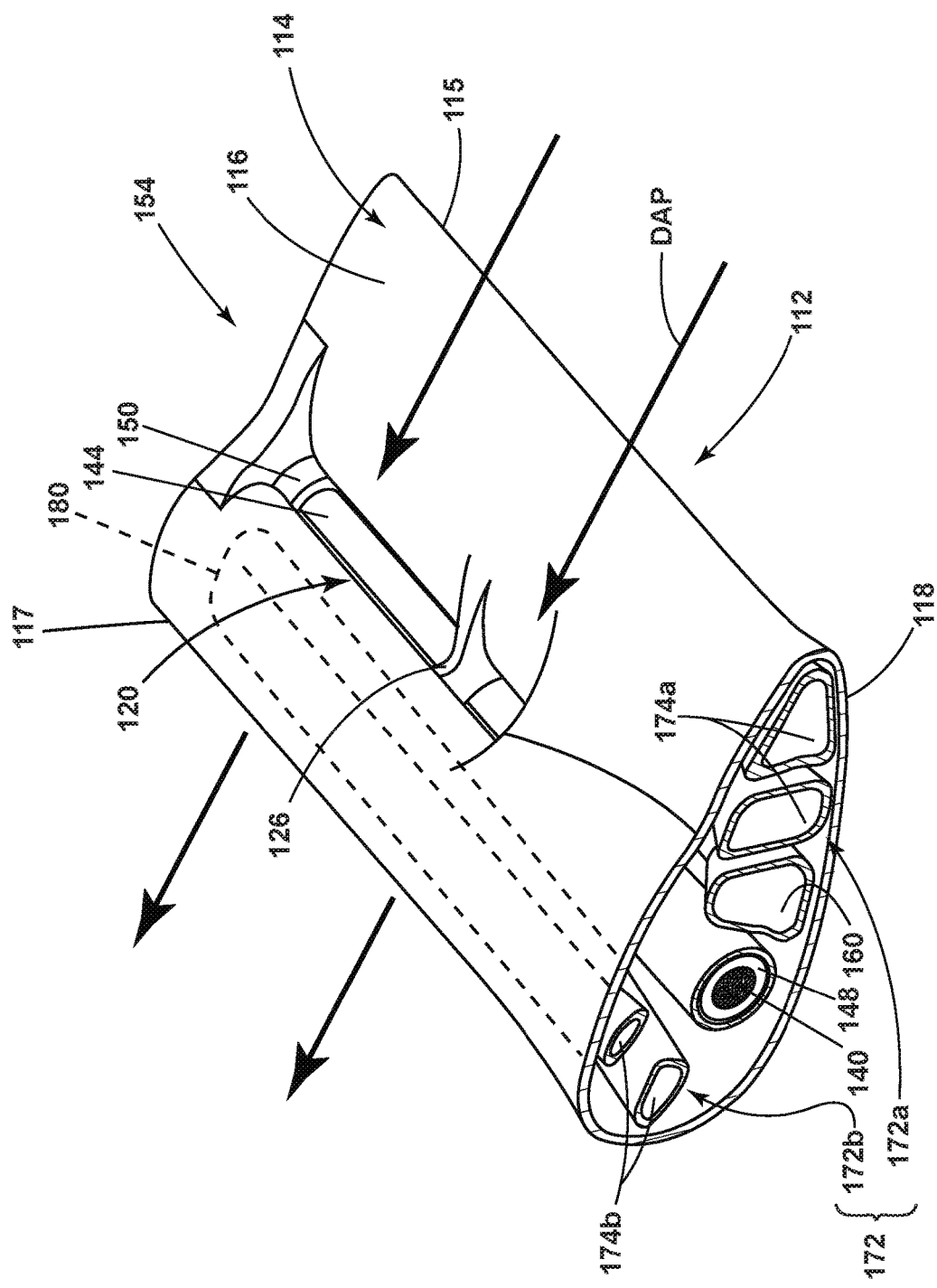
FIG. 6 is an enlarged partial cross-sectional view of a portion of the total air temperature sensor of FIG. 4.

Turning to FIG. 6, the cross section through a portion of the airfoil formed by the lower section 112 of the TAT sensor 90 more clearly illustrates a portion of the set of fluid passageways 172. It can be seen that the first and second fluid passageways 172a, 172b are located on opposite sides of the housing 120 and on either side of the diverted airflow path (DAP). It can also be seen that an airfoil cross section 154 can be asymmetrical although this need not be the case.

Additionally, it is also more clearly depicted, that the second set of channels 174b can be oriented in any suitable manner including, but not limited to, in parallel. Further, it can be seen that the set of channels 174 need not have the same shape or cross-sectional area. The second set of channels 174b can also include a second turn 180 illustrated in phantom. In this manner the second fluid passageway 172b doubles back similarly to the first fluid passageway 172a. It is further contemplated that the second set of channels 174b can be in any orientation including in serpentine, or in series patterns, and have any varying volumes such that the inlet 162 is fluidly coupled to the second set of outlets 101b within the second portion 158b of the interior 158.

The set of dead air spaces 160 is proximate the temperature sensor 144. In this manner, the lower sheath 150 along with the set of dead air spaces 160 together can shield the temperature sensor 144 from heat within the first and second set of channels 174a, 174b.

During operation the diverted airflow path (DAP) flows through the temperature sensor inlet 120 and over the lower sheath 150. The temperature sensor 144 is exposed in such a manner as to record a temperature of the diverted airflow path (DAP). During operation the exterior surface 103 of the airfoil portion 114 may become warmed from heat within the first and second set of channels 174a, 174b. The lower sheath 150 channels any warmed air at the exterior surface 103 away from the temperature sensor 144 and prevents the warmed air from reaching the temperature sensor 144 reducing deicing errors. The diverted airflow path (DAP) and lower sheath 150 function to form an airflow stagnation area about the temperature sensor 144 to provide for a total air temperature reading by the temperature sensor 144.

FIG. 7 illustrates a plurality of airflow paths shown in a partial cross-section of the housing 102. The airflow paths within the housing 102 are defined at least in part by the set of fluid passageways 172.

During operation, the hot bleed air 110 can enter at the inlet 162 and be dispersed by the set of spray openings 164 within the dispersion chamber 166. A first portion 110a of the hot bleed air 110 flows through the intermediate conduits 198 and along the first fluid passageways 172a defining a first hot airflow path (FAP). The first hot airflow path (FAP) can flow along the length (L) of the housing 102 and at least in part along the leading edge 115 of the airfoil portion 114. The first hot airflow path (FAP) can turn at the first turn 176, and exit through the first set of outlets 101a.

The transfer tube 182 changes from an orientation perpendicular the length L to an orientation parallel the length L at a third turn 184. The transfer tube 182 fluidly couples the inlet 162 to the second fluid passageways 172b. A second portion 110b of the hot bleed air 110 enters at the inlet 162 and flows along the second fluid passageways 172b. The second hot airflow path (SAP) flows through the transfer tube 182 perpendicular to the length (L) of the housing, turns at the third turn 184 to flow along the portion 178 of the housing 102, turns again at the second turn 180 and exits through the second set of outlets 101b.

The first hot airflow path (FAP) is configured to heat the portion of the skin 100a proximate the leading edge 115 of the airfoil portion 114. The second hot airflow path (SAP) is configured to heat the skin 100b proximate the open portion 124 of the airfoil portion 114. Together the first hot airflow path (FAP) and the second hot airflow path (SAP) heat the exterior 103 surface of the housing 102 to prevent ice buildup along the airfoil portion 114.

A method of forming the TAT sensor 90 as described herein can include forming, via additive manufacturing the housing 102 with the skin 100 defining the interior 158 and including the airfoil cross section 154 defining the airfoil portion 114. The additive manufacturing can form the airfoil portion including the upper surface 116 and the lower surface 118. The additive manufacturing can form the set of fluid passageways 172 within the interior 158 and the inlet 162 and the set of outlets 101 located within the housing. The additive manufacturing can form the cap 191 integrally with a remainder of the housing 102; thus, forming the tip 163 and the set of spray openings 164. The additive manufacturing is done such that the set of fluid passageways 172 are configured to receive the hot bleed air 110 via the inlet 162 and disperse the hot bleed air 110 to the set of outlets 101 to heat at least a portion of the exterior surface. The additive manufacturing by way of non-limiting examples, can include direct metal laser melting or direct metal laser sintering.

Benefits associated with the disclosure discussed herein includes pneumatically supplying heated air and directing the heated air to critical locations of the sensor housing without impacting the sensor's reading. Location and size of the channels can be optimized using additive manufacturing without relying on current conventional subtractive manufacturing, by way of non-limiting example machining, drilling, and grinding.

Typical sensor exposed to an icing environment have been mechanically designed or positioned in the environment so that any large amounts of ice shed from the sensor will not damage items behind it. This limits location selection for the TAT sensor, and therefore limits the performance of the TAT sensor. Eliminating the ice shedding with heating systems within the TAT sensor improves location possibilities. Additionally considering increased sensitivity to ice shedding in current engine design, TAT sensors with minimal to no ice shedding are preferred.

Additively manufacturing the TAT sensor allows for locating of the heating channels along any desired location. Assembly time of the TAT sensor is also reduced due to the housing being additively manufactured.

Additionally the dispersion chamber as described herein utilizes an outlet with a set of spray openings for direct heating to areas of the TAT sensor with high ice concentrations. The diffused hot air is then transferred to the airfoil portion of the TAT sensor to further remove ice buildup.

It should be understood that application of the disclosed design is not limited to turbine engines with fan and booster sections, but is applicable to turbojets and turbo engines as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An air temperature sensor, comprising:
    a housing having an upper section configured to be coupled with a portion of an aircraft engine and a lower section having an airfoil cross section;
    a temperature sensor located within the lower section of the housing;
    a dispersion chamber located within the upper section of the housing;
    a set of fluid passageways having at least two channels oriented parallel to each other and configured to direct an airflow in opposing directions, defined within the housing and fluidly coupled to the dispersion chamber;

a piccolo tube having a first end fluidly coupled to receive bleed air from a portion of the aircraft engine and a second end, fluidly coupled to the first end, and where the second end includes a set of spray openings configured to allow bleed air to spray into portions of the dispersion chamber and the set of fluid passageways.

2. The air temperature sensor of claim 1 wherein the set of spray openings are spaced about a perimeter of the second end.

3. The air temperature sensor of claim 2 wherein the set of spray openings are equally spaced about a perimeter of the second end.

4. The air temperature sensor of claim 1 wherein the second end comprises a tip with the set of spray openings located therein.

5. The air temperature sensor of claim 4 wherein the tip is located within the dispersion chamber and configured to direct the bleed air to surfaces forming the dispersion chamber.

6. The air temperature sensor of claim 5 wherein the set of fluid passageways includes a first fluid passageway within a first portion of the housing and a second fluid passageway with a second portion of the housing.

7. The air temperature sensor of claim 6 wherein the set of spray openings are configured to direct the bleed air into the first fluid passageway and the second fluid passageway.

8. The air temperature sensor of claim 5 wherein the set of spray openings are configured to spray the bleed air into at least one corner of the dispersion chamber.

9. The air temperature sensor housing of claim 4 wherein at least some of the set of spray openings are staggered about a circumference of tip.

10. The air temperature sensor of claim 9 wherein at least one of the set of spray openings is formed at a distal end of the tip.

11. The air temperature sensor of claim 1, further comprising an intermediate conduit fluidly coupling the dispersion chamber to at least one of the set of fluid passageways.

12. The air temperature sensor of claim 11 wherein at least one of the set of spray openings is configured to direct the bleed air into the intermediate conduit.

* * * * *